(12) United States Patent
Elnaffar et al.

(10) Patent No.: US 7,499,908 B2
(45) Date of Patent: Mar. 3, 2009

(54) METHOD FOR IDENTIFYING A WORKLOAD TYPE FOR A GIVEN WORKLOAD OF DATABASE REQUESTS

(75) Inventors: Said Elnaffar, Kingston (CA); Randall W. Horman, Toronto (CA); Sam S. Lightstone, Toronto (CA); Pat Martin, Kingston (CA); Bernhard K. Schiefer, Pickering (CA); Robin D. Van Boeschoten, Kitchener (CA)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 10/425,171

(22) Filed: Apr. 29, 2003

(65) Prior Publication Data

US 2004/0225631 A1 Nov. 11, 2004

(51) Int. Cl.
*G06F 17/30* (2006.01)
(52) U.S. Cl. .................... 707/2; 707/6; 707/101
(58) Field of Classification Search ........... 707/104.1; 702/186; 705/10
See application file for complete search history.

(56) References Cited

U.S. PATENT DOCUMENTS

| | | | |
|---|---|---|---|
| 5,727,199 A | 3/1998 | Chen et al. ............ 395/606 |
| 5,787,274 A | 7/1998 | Agrawal et al. ........ 395/613 |
| 5,799,311 A | 8/1998 | Agrawal et al. ........ 707/102 |
| 5,870,735 A | 2/1999 | Agrawal et al. ........ 707/3 |
| 6,055,539 A | 4/2000 | Singh et al. ........... 707/102 |
| 6,138,115 A | 10/2000 | Agrawal et al. ....... 707/3 |
| 6,182,058 B1 | 1/2001 | Kohavi ................. 706/45 |
| 6,219,660 B1 | 4/2001 | Haderle et al. .......... 707/1 |
| 6,223,171 B1 | 4/2001 | Chaudhuri et al. ...... 707/2 |
| 6,230,151 B1 | 5/2001 | Agrawal et al. ....... 706/12 |
| 6,247,016 B1 | 6/2001 | Rastogi et al. ........ 707/101 |

(Continued)

FOREIGN PATENT DOCUMENTS

WO WO 00/65480 11/2000

(Continued)

OTHER PUBLICATIONS

Title: A Methodology for Auto-recognizing DBMS Workloads
Author: Said S. Elnaffar Nov. 2002.*

(Continued)

*Primary Examiner*—Khanh B Pham
(74) *Attorney, Agent, or Firm*—Kunzler & McKenzie

(57) ABSTRACT

Workload type to be managed by a database management system (DBMS) is a key consideration in tuning the DBMS. Allocations for resources, such as main memory, can be very different depending on whether the workload type is Online Transaction Processing (OLTP) or Decision Support System (DSS). The DBMS also experiences changes in workload type during the normal processing cycle of the DBMS. It would be preferable for the database administrators to recognize the significant shifts of workload type that demand reconfiguring the DBMS to maintain acceptable levels of performance. Disclosed is a workload type classifier module, used by a DBMS, for recognizing workload types so that the DBMS may then manage or adjust its performance and reconfigure its resources accordingly. The classifier may be constructed based on the most significant workload characteristics that differentiate OLTP from DSS. The classifier is then used for identifying changes in workload types contained in a workload.

12 Claims, 17 Drawing Sheets

Using the workload classifier to identify an unknown workload

U.S. PATENT DOCUMENTS

| | | | |
|---|---|---|---|
| 6,338,055 B1 | 1/2002 | Hagmann et al. | 707/2 |
| 6,356,890 B1 | 3/2002 | Agrawal et al. | 707/2 |
| 6,356,891 B1 | 3/2002 | Agrawal et al. | 707/2 |
| 6,360,224 B1 | 3/2002 | Chickering | 707/100 |
| 6,366,903 B1 | 4/2002 | Agrawal et al. | 707/2 |
| 6,388,592 B1 | 5/2002 | Natarajan | 341/107 |
| 6,542,854 B2 * | 4/2003 | Yang et al. | 702/186 |
| 6,557,008 B1 * | 4/2003 | Temple et al. | 707/104.1 |
| 2002/0069102 A1 * | 6/2002 | Vellante et al. | 705/10 |

FOREIGN PATENT DOCUMENTS

| | | | |
|---|---|---|---|
| WO | WO 01/29690 A2 | 4/2001 | |

OTHER PUBLICATIONS

Menasce et al., "A Methodology for Workload Characterization of E-commerce Sites", Proceedings of the 1st ACM conference on Electronic commerce, pp. 119-128, 1999.*

Barroso et al., "Memory System Characterization of Commercial Workload", Proceedings of the 25th annual international symposium on Computer architecture (ISCA '98), pp. 3-14, 1998.*

"Optimal Splitting Algorithm for Arbitrary Random Predictors in the Two-Class Problem" IBM Technical Disclosure Bulletin, Nov. 1989.

* cited by examiner

Different Shades of DSS and OLTP workloads

| TPC-C | TPC Benchmark C Standard Specification |
|---|---|
| OLTP | Online Transactional Processing |
| OLTP | Online Transactional Processing |
| HO | Heavy OLTP |
| LO | Light OLTP |
| DSS | Decision Support System |
| HD | Heavy DSS workload |
| LD | Light DSS workload |

Candidate attributes for snapshot objects

Method for constructing a workload classifier

Using the workload classifier to identify an unknown workload

The pruned decision tree for Classifier (O, B) in which one of the classification rules is shown The classification tree of Classifier (C, H)

Classifier (O, B) identifying DSS and OLTP mixes in the Browsing and Ordering workloads Identifying the Shopping profile Classifier (O, B) is robust against changes in the system configuration Classifier(C, H) and Classifier (O, B) identifying TPC-C and TPC-H workloads Classifier(C, H) and Classifier (O, B) identifying the three workload profiles of TPC-W The decision tree of the hybrid classifier (HC)

Prediction accuracy of HC

GHC's analysis of TPC-generated workloads

Identifying the type of workload to be made by human intervention

| System-Dependence | Snapshot Attribute | Weight |
|---|---|---|
| Low | Queries Ratio | 1.0 |
| | Pages Read | 1.0 |
| | Rows Selected | 1.0 |
| | Pages Scanned | 1.0 |
| | Logging | 1.0 |
| Medium | Number of Sorts | 0.75 |
| | Ratio of Using Indexes | 0.75 |
| High | Sort Time | 0.3 |
| | Number of Locks Held | 0.3 |

FIGURE 16

Table 1: categorizing the snapshot attributes based on their sensitivity towards system configuration

| Workload | OS | DB Scale | Memory | CPU | Remarks |
|---|---|---|---|---|---|
| TPC-W | Windows® 2000 Professional | 10,000 items | 512 MB | Pentium III, 733 MHz | 100 Emulated Browser; all profiles |
| TPC-H | Windows® 2000 Server | 1GB | 512 MB | 8-way Pentium II 200 MHz | Throughput test; 25 streams |
| TPC-C | Windows NT® Server 4.0 | 100 Warehouses | 3 GB | 4-way Pentium II 200 MHz | |

FIGURE 17

Table 2: Benchmark settings used with DB2 Universal Database Version 7.2

| Settings used in the DB2 Intelligent Miner | |
|---|---|
| Maximum Tree Depth | No Limit Imposed |
| Maximum Purity of Internal Node | 100 |
| Minimum Records Per Internal Node | 5 |
| Attributes Weights | See Table 1 |
| Error Matrix | None |

FIGURE 18

Table 3: Parameters settings used for the SPRINT classification algorithm implemented in DB2 Intelligent Miner

| Firm | DBA's Belief | Classifier(C, H) | | Classifier(O, B) | | HC | | GHC | | | |
|---|---|---|---|---|---|---|---|---|---|---|---|
| | | DSS | OLTP | DSS | OLTP | DSS | OLTP | HD | LD | LO | HO |
| Firm-1 | Peak DSS | 62.77% | 37.23% | 90.96% | 9.04% | 89.79% | 10.21% | 0% | 88% | 11% | 1% |
| Firm-2 | Peak DSS | 100% | 0% | 98.7% | 1.3% | 100% | 0% | 0% | 98.7% | 1.3% | 0% |
| | Peak OLTP | 100% | 0% | 0% | 100% | 0% | 100% | 0% | 0% | 100% | 0% |
| Firm-3 | Peak DSS | 100% | 0% | 100% | 0% | 100% | 0% | 0% | 100% | 0% | 0% |
| | Peak OLTP | 3.13% | 96.87% | 0% | 100% | 0% | 100% | 0% | 0% | 90.62% | 9.38% |

FIGURE 19

Table 4: Recognition of industrial workloads using all types of classifiers

METHOD FOR IDENTIFYING A WORKLOAD TYPE FOR A GIVEN WORKLOAD OF DATABASE REQUESTS

FIELD OF THE INVENTION

The present invention relates in general to information retrieval systems. More specifically, the present invention relates to identifying a workload type for a given workload of database requests for an information retrieval system.

BACKGROUND OF THE INVENTION

Database administrators (DBAs) tune an information retrieval system (such as a database management system or simply "DBMS") based on their knowledge of the DBMS and its workload. The workload type, specifically whether it is Online Transactional Processing (OLTP) or Decision Support System (DSS), is a key criterion for tuning (reference is made to DB2 *Universal Database Version 7 Administration Guide: Performance*, IBM Corporation: 2000, and reference is also made to *Oracle9iDatabase Performance Guide and Reference*, Release 1(9.0.1), Part# A87503-02, Oracle Corp.: 2001). In addition, a DBMS experiences changes in the type of workload it handles during its normal processing cycle. For example, a bank may experience an OLTP-like workload by executing the traditional daily transactions for almost the whole month, while in the last few days of the month, the workload becomes more DSS-like due to the tendency of issuing financial reports and running long executive queries to produce summaries. DBAs should therefore also recognize the significant shifts in the workload and reconfigure the system to maintain acceptable levels of performance.

There is an earnest interest in building autonomic computing systems. These systems know themselves and their surrounding environment and then regulate themselves; this removes complexity from lives of administrators and users alike (reference is made to A. Ganek and T. Corbi, "*The Dawning of Autonomic Computing Era*," IBM Systems Journal, 42, 1 Mar. 2003). One of the prerequisites to achieve system autonomicity is identifying the characteristics of the workload put on the system and recognize its properties by using a process called "Workload Characterization".

There are numerous studies characterizing database workloads based on different properties that can be exploited for re-tuning the DBMS (reference is made to S. Elnaffar and P. Martin, "*Characterizing Computer Systems' Workloads*," Technical Report 2002-461, Queen's University, December 2002).

Some studies show how to use clustering to obtain classes of transactions grouped according to their consumption of system resources or according to reference patterns to tune the DBMS (reference is made to P. Yu, and A. Dan, "*Performance Analysis of Affinity Clustering on Transaction Processing Coupling Architecture*," IEEE Transactions on Knowledge and Data Engineering 6, 5, 764-786 (October 1994).

Other studies show how to use clustering to obtain classes of transactions grouped according to their consumption of system resources or according to reference patterns to balance a workload (reference is made to C. Nikolaou, A. Labrinidis, V. Bohn, D. Ferguson, M. Artavanis, C. Kloukinas, and M. Marazakis, "*The Impact of Workload Clustering on Transaction Routing*," Technical Report FORTH-ICS TR-238: December 1998).

Yet other studies focus on how to characterize database access patterns to predict a buffer hit ratio (reference is made to Dan, P. Yu, and J. Chung, "*Characterization of Database Access Pattern for Analytic Prediction of Buffer Hit Probability*," Very Large Data Bases (VLDB) Journal 4, No. 1, 127-154: 1995).

Yet again, other studies focus on how to characterize database access patterns to predict user access behavior (reference is made to C. Sapia, "*PROMISE: Predicting Query Behavior to Enable Predictive Caching Strategies for OLAP Systems*,". Proc. of the Second International Conference on Data Warehousing and Knowledge Discovery (DAWAK 2000), 224-233: 2000).

Recent studies characterize DBMS workloads on different computer architectures to diagnose performance degradation problems (reference is made to A. Ailamaki, D. DeWitt, M. Hill, and D. Wood, "*DBMSs On A Modern Processor: Where Does Time Go?*," Proc. of Int. Conf. On Very Large Data Bases (VLDB '99), 266-277: September 1999).

Other recent studies characterize DBMS workloads on different computer architectures to characterize the memory system behavior of the OLTP and DSS workloads (reference is made to L. Barroso, K. Gharachorloo, and E. Bugnion, "*Memory System Characterization of Commercial Workloads*," Proc. Of the 25th International Symposium on Computer Architecture, 3-14: June 1998).

Another reference systematically analyzes the workload characteristics of workloads specified in TPC-C™ (TPC Benchmark C Standard Specification Revision 5.0, Transaction Processing Performance Council: February 2001) and TPC-D™ (TPC Benchmark D Standard Specification Revision 2.1, Transaction Processing Performance Council: 1999), especially in relation to those of real production database workloads. It has been shown that the production workloads exhibit a wide range of behavior. In general, the two benchmarks complement each other in reflecting the characteristics of the production workloads (reference is made to W. Hsu, A. Smith, and H. Young, "*Characteristics of Production Database Workloads and the TPC Benchmarks*," IBM Systems Journal 40, No. 3: 2001).

To progress towards Autonomic Database Management Systems (ADBMSs), workload characterization is imperative in a world that increasingly deploys "universal" database servers that are capable of operating on a variety of structured, semi-structured and unstructured data and across varied workloads ranging from OLTP through DSS. Universal database servers, such as IBM® DB2, Universal Database‰ (reference is made to *DB2 Universal Database Version 7 Administration Guide: Performance*, IBM Corporation: 2000), allow organizations to develop database skills on a single technology base that covers the broad needs of their business. Universal databases are increasingly used for varying workloads whose characteristics change over time in a cyclical way. Most of the leading database servers today fall into this category of universal database, being intended for use across a broad set of data and purposes.

What is therefore needed is a method for identifying types of DBMS workloads. The need for such a method has heretofore remained unsatisfied.

SUMMARY OF THE INVENTION

The present invention satisfies this need, and presents a system and an associated method (collectively referred to herein as "the system" or "the present system") for identifying a type of workload contained in a given workload to be processed by the DBMS. The present system operates as a workload classifier for use with or in an information retrieval system such as a DBMS. A workload is a set of database requests that are submitted to a DBMS. These requests are essentially SQL statements that comprise queries, that is, SELECT statements, and other types of queries, such as INSERT statements, DELETE statements, and UPDATE statements. Each database request imposes some resource consumption on the DBMS leading to different performance variables.

A workload is a set of database requests that are submitted to a DBMS. These requests are essentially SQL statements that comprise queries, that is, SELECT statements, and other types of queries, such as INSERT statements, DELETE statements, and UPDATE statements. Each database request imposes some resource consumption on the DBMS leading to different performance variables.

The workload classifier analyzes DBMS performance variables under a particular workload mix (DSS or OLTP) to generate rules that can distinguish one type of workload over another. The workload classifier (hereinafter referred to as a classifier) enables improved operation of autonomic DBMSs, which are types of DBMSs that know themselves and the context surrounding their activities. This knowledge allows the autonomic DBMSs to automatically tune themselves to efficiently process the workloads submitted to them.

It is difficult to provide the workload classifier, as a solution, for a number of reasons:

There are no rigorous, formal definitions of what makes a workload DSS or OLTP. Currently, there are general, high-level descriptive rules that are known, such as:
Complex queries are more prevalent in DSS workloads than in OLTP workloads.
A DSS workload has fewer concurrent users accessing the system than does an OLTP workload.
An autonomous computing solution requires that the DBMS identify the workload type using only information available from the DBMS itself or from the operating system (OS); no human intervention is involved.
A solution should be online and inexpensive. This entails adopting lightweight monitoring and analysis tools to reduce system perturbation and minimize performance degradation.
A solution should be tolerant of changes in the system settings and in the DBMS configuration parameters.
A solution should assess the degree to which a workload is DSS or OLTP, that is, the concentration of each type in the mix. Any subsequent performance tuning procedure should be a function of these degrees.

The classifier treats workload type identification as a data mining classification problem, in which DSS and OLTP are the class labels, and the data objects that are classified are database performance snapshots. The classifier was initially constructed by training it on sample OLTP and DSS workloads. It then was used to identify snapshot samples drawn from unknown workload mixes. The classifier scores the snapshots by tagging them by one of the class labels, DSS or OLTP. The number of DSS- and OLTP-tagged snapshots reflects the concentration (in relative proportions) of each type of workload in a given workload having a mix of several types of workloads.

This approach was validated experimentally with workloads generated from Transaction Processing Performance Council (TPC) benchmarks and with real workloads provided by three major global banking firms. These workloads are run on DB2® Universal Database™ Version 7.2 (reference is made to *DB2 Universal Database Version 7 Administration Guide: Performance*, IBM Corporation: 2000). Since the TPC benchmark setups that were used have not been audited per TPC specifications, the benchmark workloads that were used should only be referred to as TPC-like workloads. When the terms TPC-C, TPC-H, and TPC-W are used to refer to the benchmark workload that was used, it should be taken to mean TPC-C-, TPC-H-, and TPC-W-like, respectively. Two classifiers were constructed and evaluated. One classifier, called Classifier(C, H), was built using OLTP and DSS training data from the TPC-C™ benchmark (reference is made to *TPC Benchmark C Standard Specification Revision* 5.0, Transaction Processing Performance Council: February 2001) and TPC-H™ benchmark (reference is made to *TPC Benchmark H Standard Specification Revision* 1.3.0, Transaction Processing Performance Council: 1999) respectively. The second classifier, which was called Classifier(O, B), is built using OLTP and DSS training data from the Ordering and Browsing profiles of the TPC-W™ benchmark (reference is made to *TPC Benchmark W (Web Commerce) Standard Specification Revision* 1.7, Transaction Processing Performance Council: October 2001), respectively.

Results obtained from testing the genericness of these classifiers show that every workload is a mix of its own set of SQL statements with their own characteristics and properties. Therefore, very specialized classifiers such as Classifier(C, H) and Classifier(O, B) are not expected to always be successful. Nevertheless, it is believed that a generic classifier may be constructed, in which that generic classifier may be able to recognize a wide range of workloads by combining the knowledge derived from the analysis of different flavors of DSS and OLTP training sets. Such a generic classifier could be incorporated into a DBMS to tune, or at least to help tune, the DBMS.

Two generic classifiers are presented. The first one, the hybrid classifier (HC), is constructed by training it on a mix of the TPC-H and the Browsing profile workloads as a DSS sample, and a mix of the TPC-C and the Ordering profile workloads as an OLTP sample. The second generic classifier, the graduated-hybrid classifier (GHC), considers the TPC-H (Heavy DSS or HD) and the Browsing profile (Light DSS or LH) as different intensities or shades of DSS workloads, and the TPC-C (Heavy OLTP, or HO) and the Ordering profile (Light OLTP, or LO) as different shades of OLTP workloads in its recognition (see FIG. 1). In other words, GHC attempts to qualitatively analyze the different aspects of the DSS and OLTP elements in the workload by reporting the concentration of each workload shade comprising each type. Besides having practical advantages, GHC demonstrates that the approach provided by the present system can be applied to workloads of more than two types of work. These classifiers were evaluated with workloads generated from Transaction Processing Performance Council (TPC) benchmarks and real workloads provided by three major global banking firms.

In an aspect of the present system, there is provided, for an information retrieval system, a method of identifying a workload type for a given workload. The method comprises selecting a sample of the given workload, and predicting identification of the workload type based on a comparison between the selected sample and a set of rules.

In another aspect of the present system, there is provided an information retrieval system for identifying a workload type for a given workload. The information retrieval system comprises means for selecting a sample of the given workload, and means for predicting identification of the workload type based on a comparison between the selected sample and a set of rules.

In yet another aspect of the present system, there is provided a computer program product having a computer readable medium tangibly embodying computer executable code for directing an information retrieval system to identify a workload type for a given workload. The computer program product comprises code for selecting a sample of the given workload and code for predicting identification of the workload type based on a comparison between the selected sample and a set of rules.

In yet another aspect of the present system, there is provided a computer readable modulated carrier signal being usable over a network, the carrier signal having means embedded therein for directing an information retrieval system to identify a workload type for a given workload. The computer readable modulated carrier signal comprises means embedded in the carrier signal for selecting a sample of the given workload, and means embedded in the carrier signal for predicting identification of the workload type based on a comparison between the selected sample and a set of rules.

Other aspects and features of the present system may become apparent to those of ordinary skill in the art upon review of the following description of specific embodiments of the present system in conjunction with the accompanying figures.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein.

FIG. 16 is a table, Table 1, categorizing the snapshot attributes based on their sensitivity towards system configuration;

FIG. 17 is a table, Table 2, containing benchmark settings used with DB2 Universal Database Version 7.2;

FIG. 18 is a table, Table 3, containing parameter settings used for the SPRINT classification algorithm implemented in DB2 Intelligent Miner; and FIG. 19 is a table, Table 4, containing recognition of industrial workloads using all types of classifiers.

DETAILED DESCRIPTION OF PREFERRED EMBODIMENTS

Figure 1:
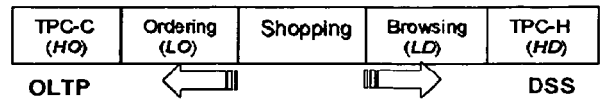
FIG. 1 is a diagram showing different shades of DSS and OLTP type workloads.

The following detailed description of the embodiments of the present invention does not limit the implementation of the invention to any particular computer programming language. The present invention may be implemented in any computer programming language provided that the OS (Operating System) provides the facilities that may support the requirements of the present invention. An embodiment is implemented in the C or C++ computer programming language (or other computer programming languages in conjunction with C/C++). Any limitations presented would be a result of a particular type of operating system, computer programming language, or data processing system and would not be a limitation of the present invention.

It may be appreciated that a workload classifier module (herein after called a classifier for simplifying the description) may contain computer programmed code in a form that is executable by a data processing system, or may contain a combination of hardware registers and computer executable code. The classifier module may be included with a database management system or may be adapted to operate in conjunction with the database management system. The classifier, if implemented as only code, may be embodied on a computer readable medium as part of a computer program product, in which the computer program product may be placed in memory of the data processing system. In this manner, the computer program product is a convenient mechanism for delivering the classifier to the data processing system. It may be appreciated that another aspect of the invention may be a computer readable modulated carrier signal that is usable over a network, in which the carrier signal comprises means embedded therein for directing an information retrieval system to identify a workload type for a given workload. The carrier signal can be used for conveying or downloading the classifier from a source data processing system to a receiving data processing system. The classifier includes a software programming code or computer program product that is typically embedded within, or installed on a computer. Alternatively, the classifier can be saved on a suitable storage medium such as a diskette, a CD, a hard drive, or like devices.

Approach

The problem of classifying DBMS workloads may be viewed as a machine-learning problem in which the classifier should learn how to recognize the type of the workload mix. The workload itself contains valuable information about its characteristics that can be extracted and analyzed using data mining tools. One approach is to use data mining classification techniques, specifically Decision Trees Induction, to build a classification module (reference is made to S. Murthy, "*Automatic Construction of Decision Trees from Data: A Multi-disciplinary Survey*," Data Mining and Knowledge Discovery 2, 345-389: 1998). One of the advantages of using decision tree induction is its high interpretability, that is, the ease of extracting the classification rules and the ability to understand and justify the results, in comparison with other techniques such as neural networks.

Overview

A classifier is built to describe a predetermined set of data classes. The classifier is constructed by analyzing a training set of data objects. Each object is described by attributes, including a class label attribute that identifies the class of the object. The learned classifier is represented in the form of a decision tree embodying the rules that can be used to categorize future data objects. In the second step, the classifier is used by a DBMS for classification or identification of DBMS workload types that may exist within a given DBMS workload. The predictive accuracy of the classifier is estimated using a test data set. If the predictive accuracy is considered acceptable in comparison to a given accuracy threshold, the classifier can be used to classify other sets of data objects for which the class label is unknown. An example of an accuracy threshold is reporting that 80%, or more, of the tested snapshots are classified as DSS or OLTP when an attempt is made to identify a DSS- or OLTP-deemed workload.

In this embodiment, the DSS and OLTP workload types are the predefined data class labels. The data objects needed to build the classifier are performance snapshots taken during the execution of a training database workload. Each snapshot reflects the workload behavior (or characteristics) at some time during the execution and is labeled as being either OLTP or DSS. In general, the classifier may be built by any arbitrary data mining classification method. Two methods were tried in this work. One method used SPRINT software, which is a fast scalable decision-tree based algorithm (reference is made to J. C. Shafer, R. Agrawal, M. Mehta, "*SPRINT: A Scalable Parallel Classifier for Data Mining*," Proc. of the 22nd Int'l Conference on Very Large Databases, Mumbai (Bombay), India: September 1996). Another method used a neural network (NN) classification using feed-forward network architecture and the back-propagation learning algorithm. Either algorithm mentioned above may be implemented in a software program called IBM® DB2® Intelligent Miner™ Version 6.1 (operating on a data processing system) for designing and configuring the classifier.

It was found that the decision tree classification method produces better results than the neural network method for several reasons. The decision tree method, as expected, is easier to use and to set up than the neural networks method. It is easier to interpret and explain the results from the decision tree method. The decision tree method provides the ability to assign weights to the attributes that reflect the importance of the attributes to the decision process. The decision tree method achieved a higher accuracy in tests than the neural network algorithm.

FIG. 18 shows Table 3 that shows settings used in the decision tree algorithm, which was adopted in implementing an embodiment of the invention.

Snapshot Attributes

The data objects needed to build the classifier are performance snapshots taken during the execution of a database workload by the DBMS. Each snapshot reflects workload behavior at some time during the execution of the database workload by the DBMS. The following criteria were used in selecting attributes to make up the snapshots:

1. Relevance. Select attributes that play a role in distinguishing between DSS and OLTP mixes;
2. Accessibility from the System. Select attributes that are readily and inexpensively obtainable from the DBMS or the operating system at run time; and
3. Low System-Dependence. Select attributes that are less sensitive to changes in the system settings or to DBMS configuration parameter changes. System settings comprise operating system resource allocations, such as memory and CPUs, and the database schema. DBMS configuration parameters comprise buffer pool sizes, sort heap size, isolation level, and the number of locks.

Initially, the following list of candidate attributes for the workload snapshots were considered:

1. Queries Ratio(%): The ratio of SELECT statements verses Update/Insert/Delete (UID) statements, which is usually higher in DSS than OLTP;
2. Pages Read: DSS transactions usually access larger portions of the database than OLTP transactions;
3. Rows Selected: Although a DSS query tends to summarize information, it may still return more rows that the OLTP query;
4. Throughput: The number of SQL statements executed during the snapshot, typically expected to be higher in OLTP than DSS;
5. Number of Locks Held: DSS transactions are typically larger and longer than OLTP transactions, so it is expected that more locks are held during the execution of a DSS transaction than an OLTP transaction;
6. Ratio of Using Indexes (%): The ratio of data pages obtained from indexes verses the pages obtained from other database objects, such as tables, to satisfy a query. This ratio is expected to be higher in an OLTP workload than DSS;
7. Number of Sorts: DSS transactions typically perform a larger number of sorts than OLTP transactions;
8. Average Sort Time: Sorts in DSS transactions are usually more complex than the sorts performed in OLTP transactions; consequently, they usually take longer time to complete;
9. Logging: It denotes the number of pages read/written from/to the log file of the database. An OLTP workload generates more logging activity than a DSS workload because of the read/modify nature of the OLTP transactions;
10. Hit Ratio (%): OLTP workloads have a higher degree of locality than DSS workloads and hence OLTP workloads may experience a higher hit ratio on buffer pool cache area; and
11. Pages Scanned: DSS applications typically access large numbers of sequential pages due to the substantial amount of full-table/index scan operations. OLTP applications typically access relatively few random pages.

The Browsing and Ordering profiles defined in the TPC-W benchmark (reference is made to TPC Benchmark W (Web Commerce) Standard Specification Revision 1.7, Transaction Processing Performance Council: October 2001) were considered as examples of DSS and OLTP workloads, respectively.

Figure 2:
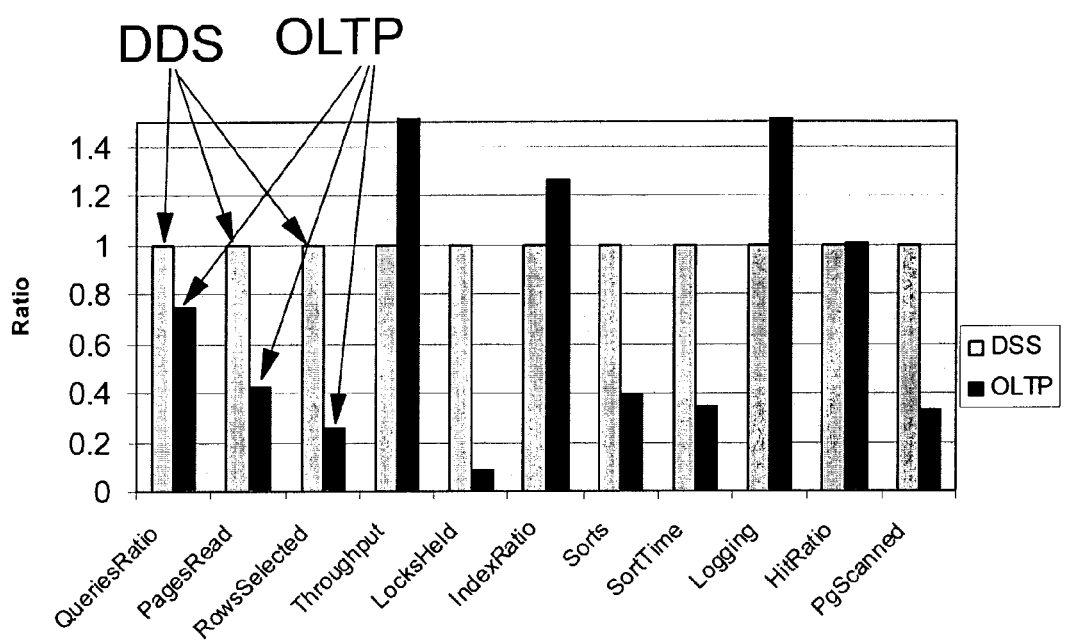
FIG. 2 is a chart showing candidate attributes for snapshot objects.

FIG. 2 shows the relative values, with the DSS values normalized to 1, for a set of candidate attributes. The values are derived from experiments with the TPC-W workloads on DB2 Universal Database (a DBMS system). Candidate attributes are all easily obtainable by the DB2 Snapshot Monitor and most of them, as illustrated in FIG. 2, are relevant. Based on the selection criteria discussed above, throughput and hit ratio was eliminated. Throughput is dependent on the current system utilization and the presently available system resources such as CPUs and memory. Hit ratio is strongly affected by the DBMS configuration, which can comprise buffer pool sizes and the assignment of database objects to these pools.

The remaining attributes are not equally system-independent. To overcome this concern, Table 1 of FIG. 16 indicates that the attributes were grouped into three classes based on their degrees of system-dependence and were assigned different weights to each class of attribute to reflect their significance to the classification process. Weights of 1.0, 0.75, and 0.3 were arbitrarily assigned to low-, medium-, and high-dependence attributes, respectively. These weights are independent of any product or system settings that were used. Any other reasonable numbers that serve in ranking the attribute classes are acceptable. Queries Ratio, Pages Read, Rows Selected, Pages Scanned, and Logging are the least sensitive to changes in the DBMS configuration. Number of Sorts and Ratio of Using Indexes are somewhat sensitive to configuration changes that are likely to occur infrequently, such as changing the current available set of indexes or views in the database schema. Sort Time and Number of Locks Held are the most sensitive to changes in the system configuration (Number of Locks Held is dependent on the isolation level, the lock escalation, the application activity, and the application design) and hence they are assigned the lowest weights.

Methodology

Figure 3:
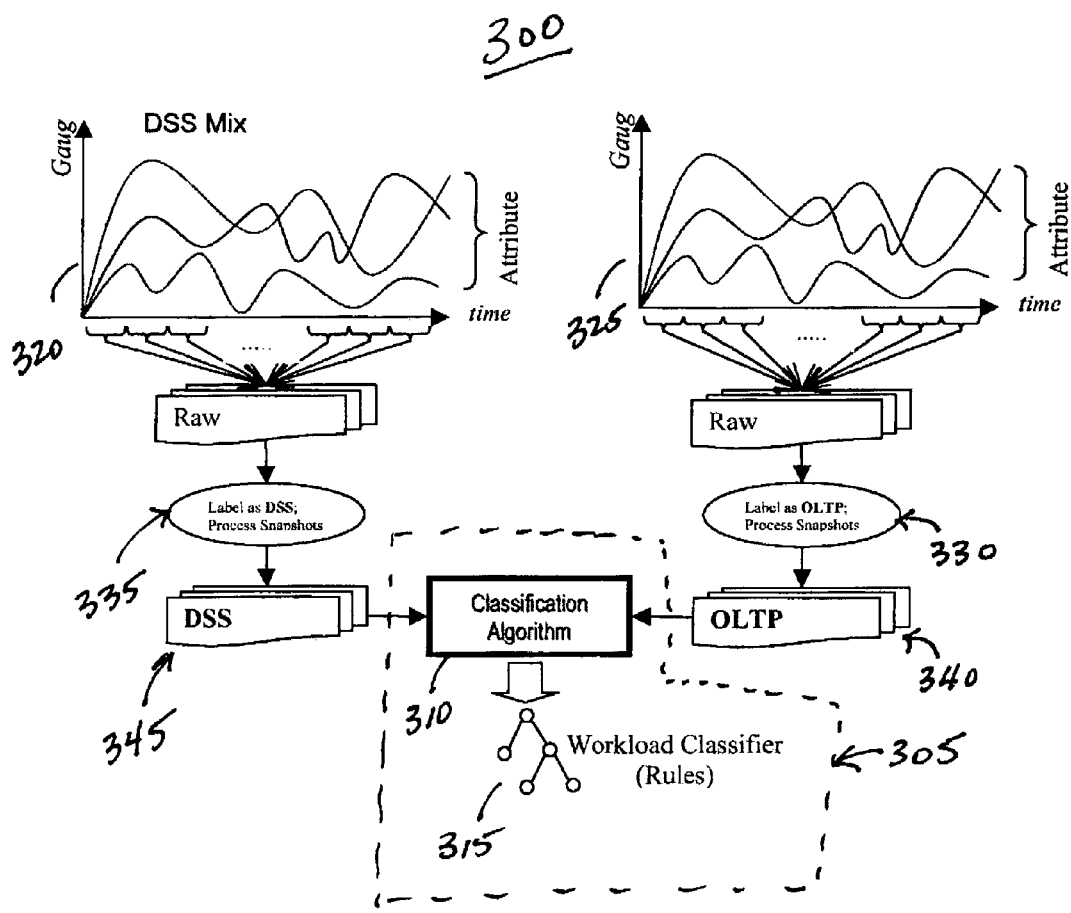
FIG. 3 is a schematic illustration of an exemplary operating environment in which a method for constructing a workload classifier of the present system can be used.

FIG. 3 shows a process or a method 300 for constructing the workload classifier module 305 comprising a classification algorithm 310 and a workload classifier 315. Sample DSS workloads 320 and OLTP workloads 325 are run and sets of snapshots for each one is collected. The snapshots are labeled as OLTP process snapshots 330 or DSS process snapshots 335 and then these labels are used as training sets OLTP 340 and DSS 345 to build the workload classifier 315, also referenced herein as classifier 315. A snapshot interval is chosen such that there are sufficient training objects to build the classifier 315 and that the interval is large enough to contain at least one completed SQL statement (a database request). The snapshot interval chosen to perform the measurements does not necessarily contain 1 query; it is just a time interval. The subsequent discussion describes the process for obtaining normalized intervals such that these intervals do correspond to one query.

With a snapshot interval of one second, it was observed that many SQL statements complete within that size interval in an OLTP-type workload. This is not the case, however, for DSS workloads that contain complex database queries that are too long to complete within one second. Therefore, the snapshots were dynamically resized by coalescing consecutive one-second raw snapshots until at least one statement completion was encompassed. The consolidated snapshots were then normalized with respect to the number of SQL statements executed within the snapshot. Consequently, each normalized snapshot describes the characteristics of a single SQL statement. During this training phase, each workload type was usually run for about 20 minutes which produced a total of 2400 one-second, raw snapshots to be processed.

Figure 4:
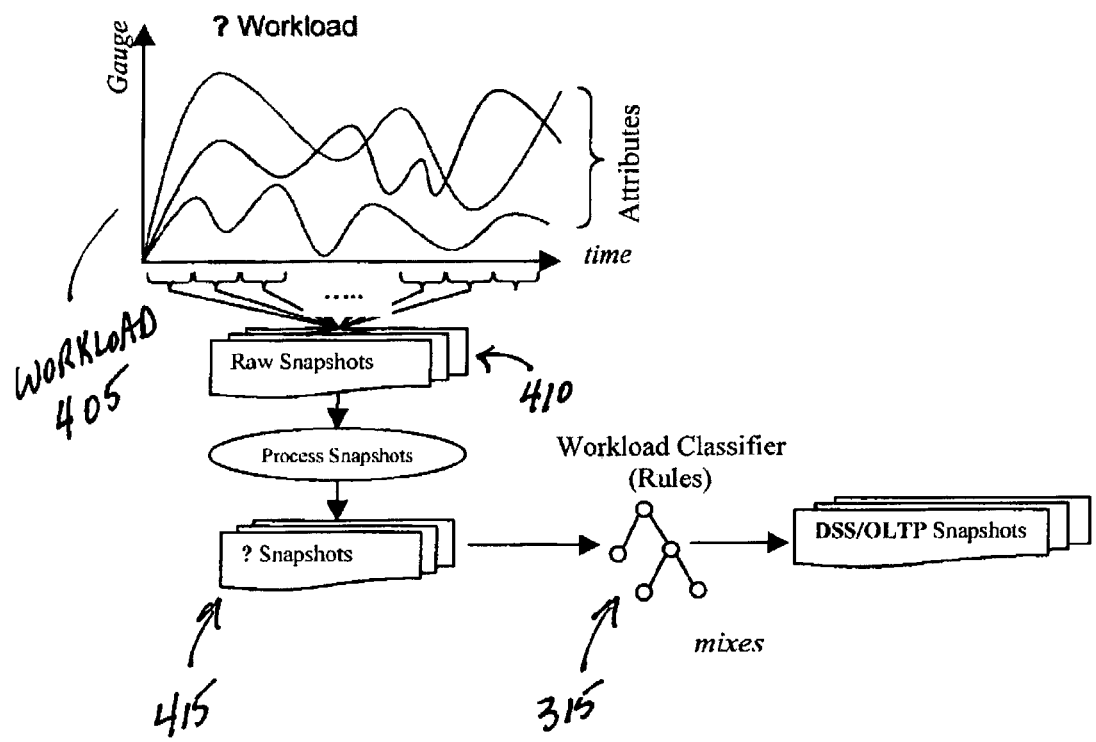
FIG. 4 is a schematic illustration showing an operating environment with an exemplary unknown load in which a workload classifier of FIG. 1 can be used.

FIG. 4 shows that after training, the generated classifier 315 was used to identify the OLTP-DSS mix of a given DBMS workload 405. The workload was run for about 10-15 minutes (producing 600-900 raw snapshots 410), and a set of consolidated snapshots 415 was produced as described above. These snapshots 415 were then fed to the classifier 315 which identifies each snapshot 415 as either DSS or OLTP, and the identification of each snapshot 415 was supported by a confidence value between 0.0 and 1.0 which indicated the probability that the class of the snapshot was predicated correctly. Only snapshots 415 with high confidence values, greater than 0.9, were considered. On average, it was observed that over 90% of the total snapshots 415 examined satisfy this condition. Eventually, the workload type concentration in the mix was computed, $C_t$, as follows:

$$C_t = \frac{N_t}{S} \leftrightarrow 100$$

where t∈{DSS, OLTP}, $N_t$ is the number of snapshots that have been classified as t, and S is the total number of snapshots considered. For the remainder of this document, this concentration may sometimes be expressed exclusively in terms of the DSS percentage (or DSSness) in the mix. The OLTP percentage is the complement of the DSSness, that is, 100−DSSness.

Experiments

Initially, two classifiers 315 were constructed for experimentation. Classifier (O, B), was built using the TPC-W Browsing and Ordering profiles as the DSS and OLTP training workloads, respectively. Classifier (C, H) was built using the TPC-H and TPC-C benchmarks as the DSS and OLTP training workloads, respectively. Each training workload was run for approximately 20 minutes, and the values of the snapshot attributes were collected every second. The important properties of the experimental setup for these runs are summarized in Table 2 (see FIG. 17) and in Table 3 (see FIG. 18).

Figure 5:
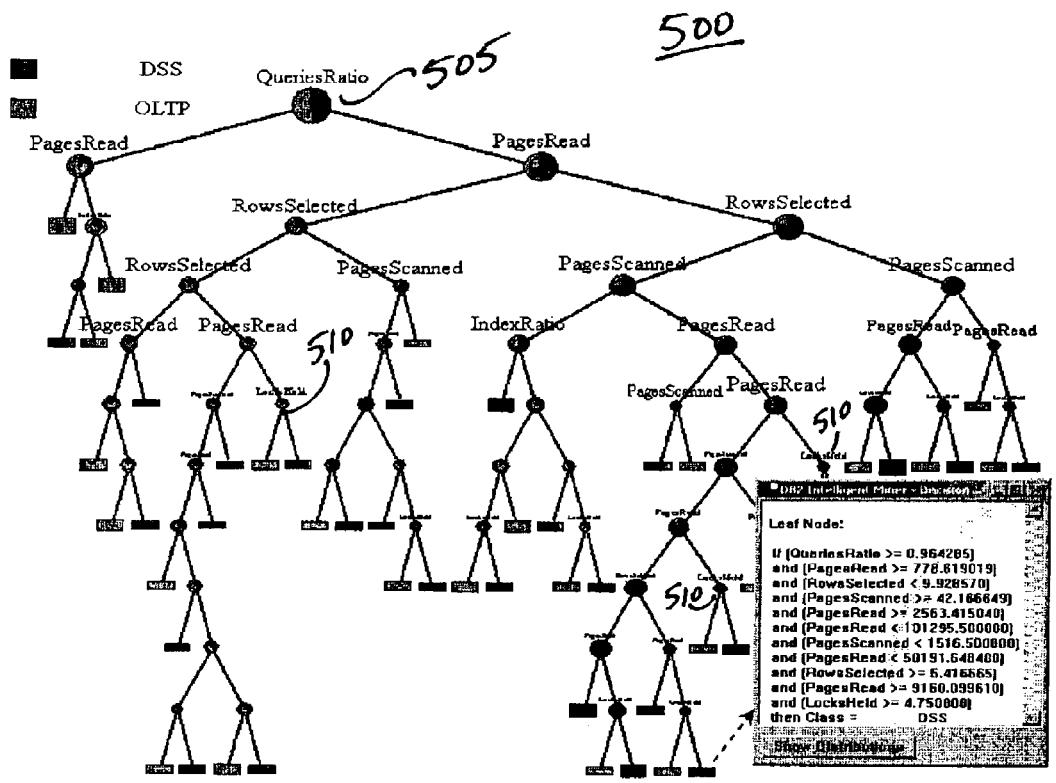
FIG. 5 is a diagram showing a pruned decision tree for Classifier(O, B) in which one of the classification rules is shown.

FIG. 5 shows the pruned decision tree 505 for Classifier(O, B). The appearance of the Queries Ratio attribute at the root of the tree reveals its importance in the classification process. On the other hand, some attributes, namely, Logging, Number of Sorts, and Sort Time, are no longer part of the decision tree since they have a limited role in distinguishing between DSS and OLTP snapshots. The appearance of the Number of Locks Held 510 attribute at lower levels of the tree reflects its low significance in the classification process. This outcome might be partially influenced by the lesser weight that was assigned to it.

Figure 6:
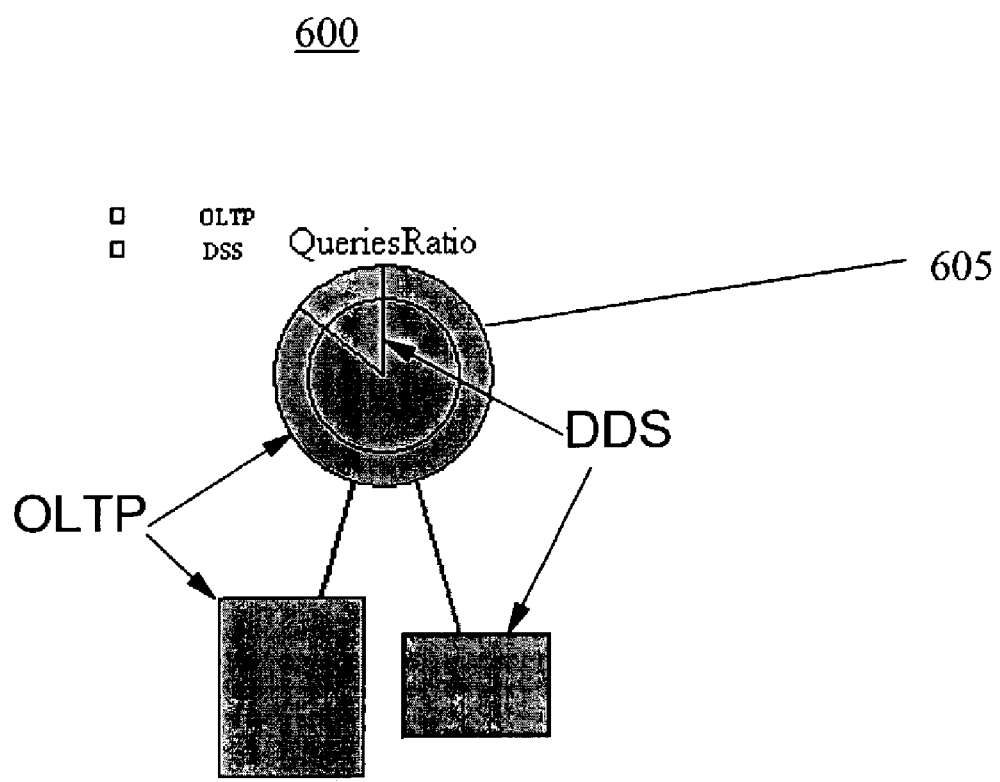
FIG. 6 is a diagram showing a classification tree of Classifier (C, H)

FIG. 6 shows the decision tree 605 of Classifier(C, H). It comprises a single node, namely a test against the Queries Ratio attribute. Apparently, the single test is sufficient to distinguish between TPC-H and TPC-C since the two workloads lie at the extreme ends of the DSS-OLTP spectrum.

Three sets of experiments were conducted to evaluate the classifiers 315. The first set of experiments evaluates the prediction accuracy of the classifiers 315 by inputting new samples from the training workloads. The second set of experiments evaluates the robustness of the classifiers 315 with respect to changes in the mix concentration of the initial workloads, and with respect to changes to the system (DBMS) configuration. The third set of experiments examines the genericness of the classifiers 315, that is, their ability to recognize types of DBMS workloads that may be contained within the DBMS workload. Both benchmark workloads and industry-supplied workloads were used in these experiments.

All workloads were run on a DBMS manufactured by IBM and this DBMS is called DB2® Universal Database™ Version 7.2. The core parameters for the workloads are shown in Table 2 (see FIG. 17). Information about this DBMS can be found in *DB2 Universal Database Version 7: Administration Guide: Performance*, IBM Corporation (2000).

Prediction Accuracy

Figure 7:
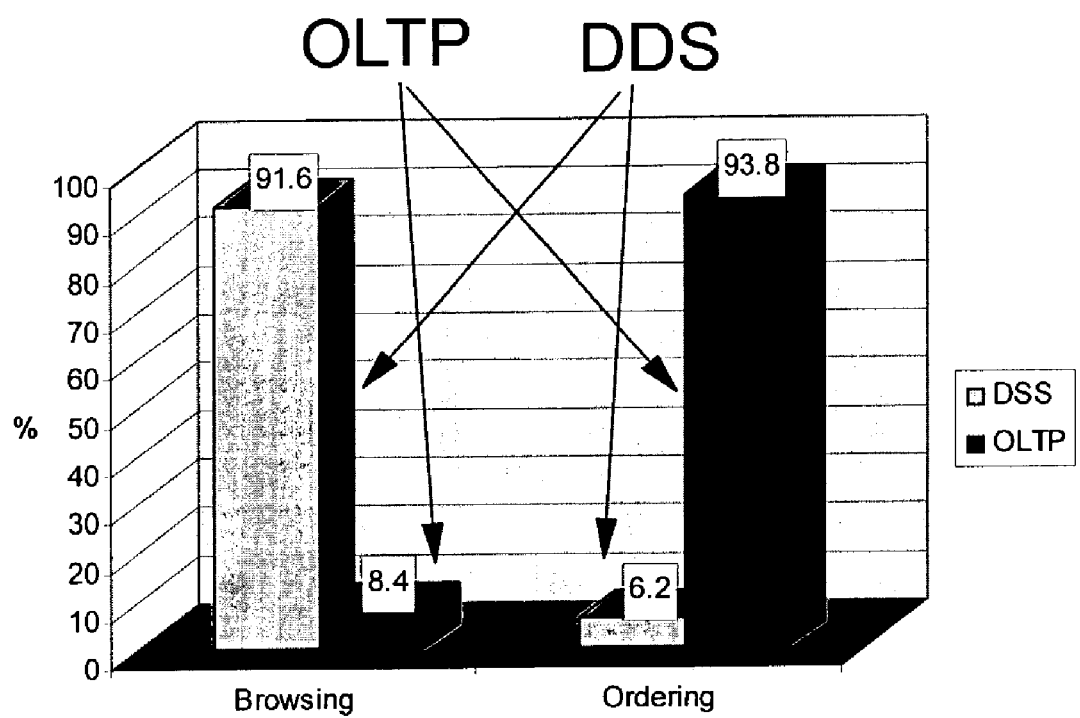
FIG. 7 is a chart illustrating the method by which Classifier (O, B) identifies DSS and OLTP mixes in the Browsing and Ordering workloads.

FIG. 7 shows the results of testing Classifier (O, B) against test samples drawn from the Browsing and Ordering profiles. FIG. 7 shows that Classifier(O, B) reports that approximately 91.6% of the snapshots in the Browsing workload are DSS while the rest, 8.4%, are OLTP, whereas it reports that approximately 6.2% of the snapshots in the Ordering workload are DSS while the rest, 93.8%, are OLTP. Similarly, when Classifier(C, H) was applied on test samples drawn from TPC-C and TPC-H, it reported that the samples were 100% OLTP and 100% DSS, respectively. Based on the inventor's understanding of the characteristics of these standard workloads, and on their description in the benchmark specifications, these results meet the expectations of the inventors.

Robustness

The Shopping profile was used, a third mix available in TPC-W, to evaluate the ability of the workload classifiers 315 to detect variation in the type intensity of a workload.

Figure 8:
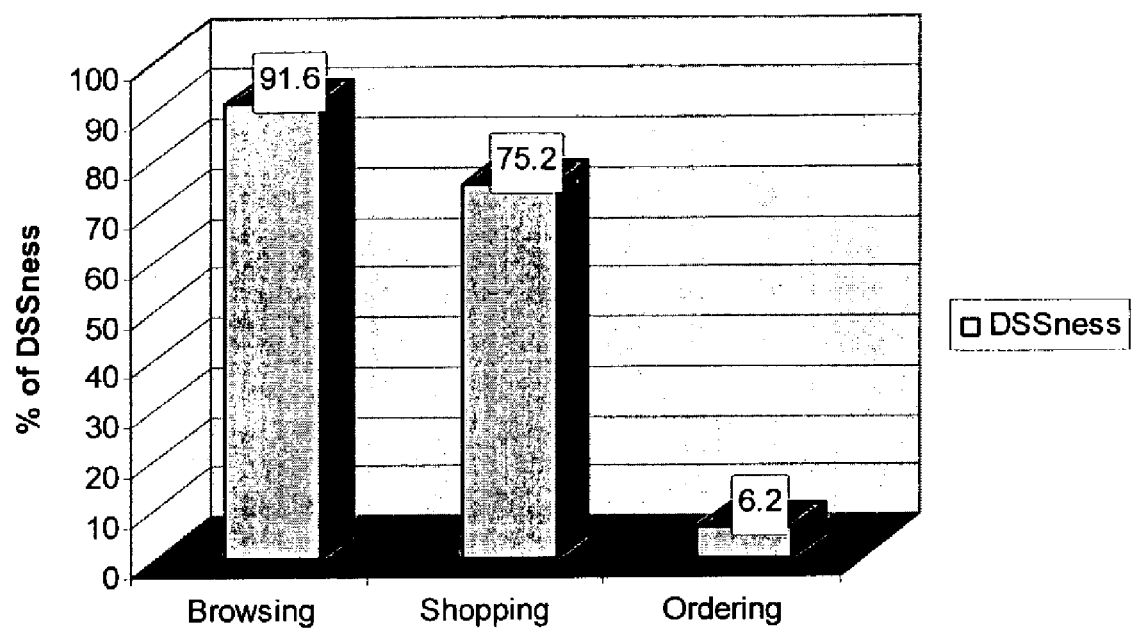
FIG. 8 is a chart illustrating the method by which the workload classifier of FIG. 1 identifies a Shopping profile.

FIG. 8 shows Classifier (O, B) reports 75.2% of the Shopping profile is DSS, which means that the Shopping is closer to Browsing than Ordering. This finding matches the TPC-W specifications, which shows that the classifier 315 has effectively learnt the characteristics of the TPC-W workload and that the classifier 315 is able to accurately sense any variation in workload type intensity.

A tolerance of a classifier 315 was also examined for changes in the system (DBMS) configurations. For the construction of the classifiers 315 discussed above, the training workloads were run with DB2 Universal Database under the default configuration and with 512 MB of main memory. These classifiers 315 were then tested against workloads run on a poorly configured DB2 Universal Database. Specifically, and to cause a dramatic confusion to the classifiers 315, the Browsing profile were run on a system configured for OLTP and the Ordering profile was run on a system configured for DSS. Furthermore, the total memory available for the DBMS was reduced to 256 MB to cause additional impact on the system.

Figure 9:
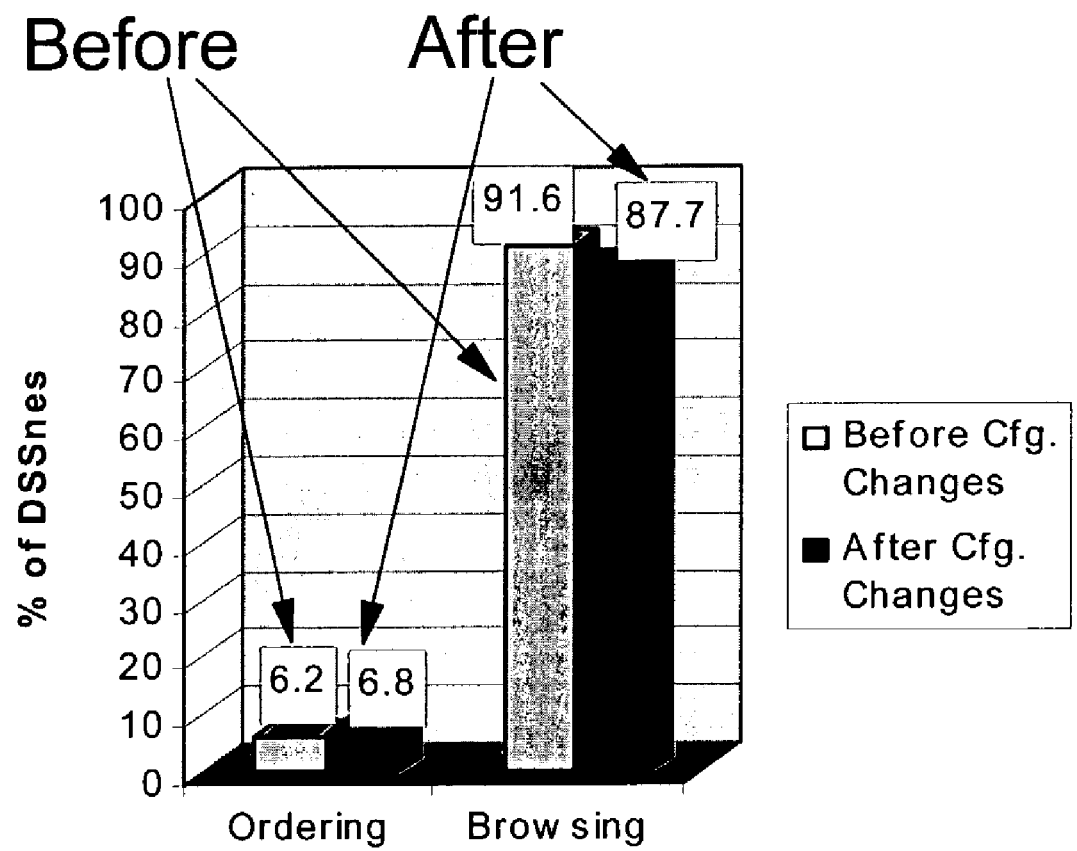
FIG. 9 is a chart demonstrating the robustness of Classifier (O, B) against changes in the system configuration.

FIG. 9 shows that, even under these changes, Classifier (O, B) still shows high degrees of accuracy and tolerance to system changes. The predictions reported under the changed system configurations deviate from those of the original by 1%-4%, which is not significant.

Genericness of Classifier(C, H) and Classifier(O, B)

To evaluate the general usefulness of the classifiers 315, a classifier 315 trained on particular workload mixes was tested to determine whether the classifier 315 can be used to recognize mixes of another workload. Classifier(C, H) and Classifier(O, B) was tested with both benchmark-generated workloads and industrial workloads.

Benchmark Workloads

Figure 10:
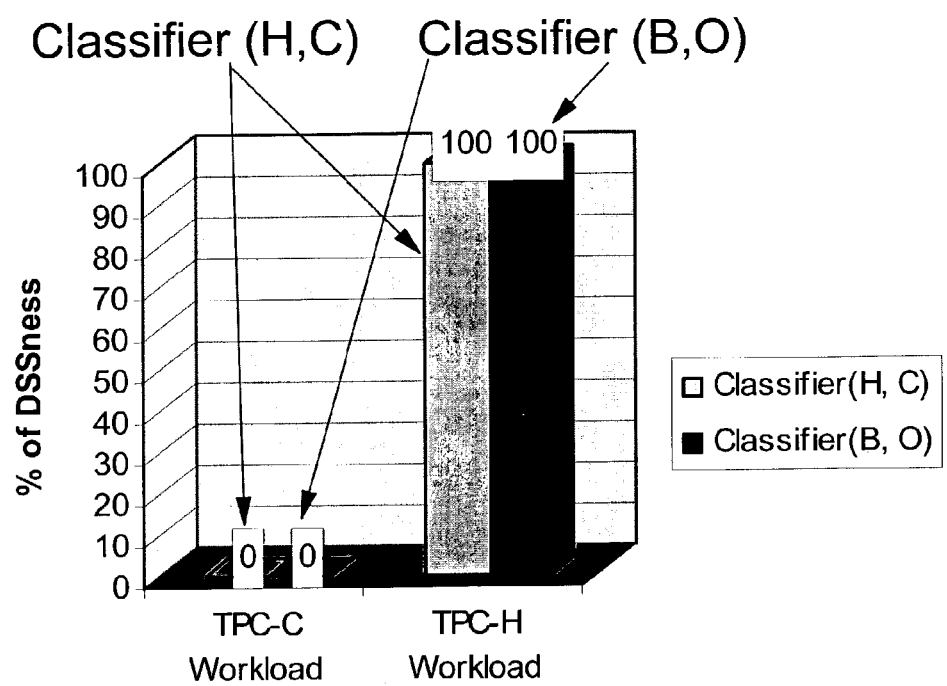
FIG. 10 is a chart showing Classifier(C, H) and Classifier (O, B) identifying TPC-C and TPC-H workloads.

FIG. 10 shows that both Classifier (O, B) and Classifier(C, H) can identify workload types in the TPC-C and TPC-H workloads.

Figure 11:
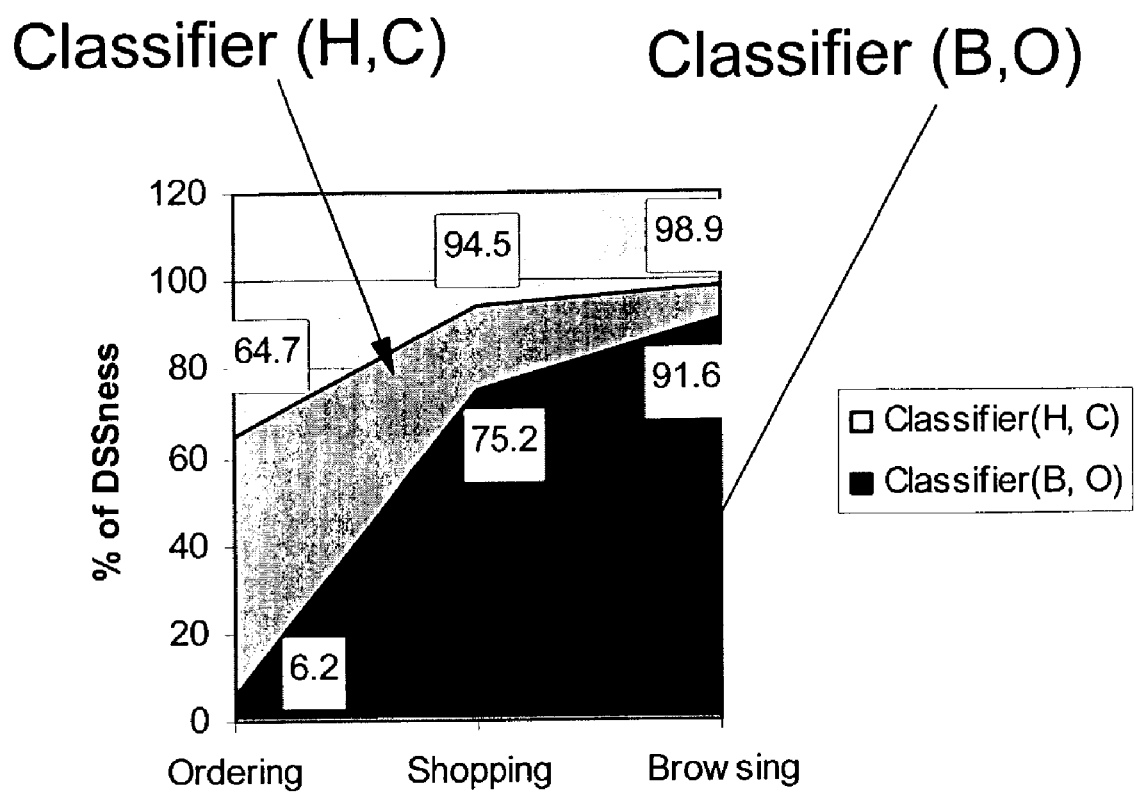
FIG. 11 is a graph illustrating Classifier(C, H) and Classifier (O, B) identifying the three workload profiles of TPC-W.

FIG. 11 compares the prediction accuracy of the two classifiers 315 against the three mixes of TPC-W. Classifier(C, H) shows poor results due to its simple, single rule derived from the two extreme workloads. It was concluded from these results that a single rule may not be sufficient to distinguish between the mixes of a moderate workload like TPC-W.

Industrial Workloads

The industrial workloads, used for testing the classifiers 315, were samples provided by three global investment banking firms identified simply as Firm-1, Firm-2, and Firm-3 in the remainder of this document. These firms each provided online financial services including investment research tools and functions for creating and tracking orders. Based on descriptions of the applications provided by these firms, it was extrapolated that the characteristics of workloads of these firms resembled the TPC-W profile workloads. Therefore, it was assumed that Classifier(O, B) was the most appropriate classifier 315 for use with their workloads.

FIG. 19 shows Table 4 which summarizes the results of the experiments with the industrial workloads using all types of classifiers 315 (hybrid classifiers 315 is explained in the next section).

Firm-1 provided several workload samples from an online decision support system that helps investors and shareholders obtain the most recent information about the market status to help them balance their portfolios and make knowledgeable financial decisions. There appeared to be a resemblance between the characteristics of Firm-1's workload and of the Browsing profile, and as such this workload type was identifying by using Classifier(O, B). As shown in Table 4 (see FIG. 19), Classifier(O, B) reported 90.96% of DSSness, which satisfies expectations. On the other hand, Classifier(C, H) was deemed to have failed in its identification (62.77% DSSness).

Firm-2 provided samples from both DSS and OLTP workloads. The DSS workload was characterized by complex database queries accessing a large fact table (over 3 million rows) and performing join operations with five other small tables. The OLTP workloads, on the other hand, comprise transactions that involve INSERT, UPDATE, and DELETE SQL statements and many simple SELECT statements. Table 4 (see FIG. 19) shows the concentration of DSS work in Firm-2's workloads reported by both classifiers 315. Classifier(C, H) was able to correctly identify the DSS concentration in the DSS workload but was considered to have failed with the OLTP workload. This failure is again due to the simplicity of this sort of classifier 315, which relies solely on the ratio of the queries (that is, Queries Ratio attribute) in the workload mix. The OLTP workload was mistakenly classified as 100% DSS because it contained a substantial number of queries. Classifier(O, B), on the other hand, correctly identified the Firm-2's workload types, which may be another indication of the need for a more complex decision tree with more multiple-attribute rules in the general case.

Firm-3 provides their customers with a set of DSS-like functions to search for stock information and a set of OLTP-like functions to place orders and manage accounts. This also comprised administrative tasks such as making money transfers among accounts, and changing account and trading passwords. The different DSS and OLTP samples collected from this firm were collected in a more controlled environment as test systems were monitored, making relatively easy to determine when to collect relatively pure DSS and OLTP workload mixes. Table 4 (see FIG. 19) shows that Classifier(O, B) and Classifier(C, H) successfully identified the DSS workload (DSSness=100%) and the OLTP workload (OLTPness>95%) of Firm-3.

Constructing Generic Classifiers

Notwithstanding the success of Classifier(O, B), the above results obtained from assessing the genericness of the two classifiers 315 may lead one to believe that a classifier 315 trained on a particular workload should not be expected to be universally competent at identifying other workloads, especially if the other workloads have different characteristics. Every workload is a mix of its own set of SQL statements (database queries) with their own characteristics. Nevertheless, it may be possible to construct a more generic classifier 315, which may be called a hybrid classifier 315, by training this hybrid classifier 315 on different flavors of DSS and OLTP mixes to derive more generic rules that can recognize a wider range of workloads. A hybrid classifier 315 can be made more generic by training it on different samples drawn from different flavors of DSS and OLTP workloads. Such training should empower or improve the prediction accuracy because the hybrid classifier 315 would attempt to generate rules that could take into account a wider variety of different workload characteristics. In the subsequent sections, there may be described two hybrid classifiers 315 that were built and evaluated, namely the Hybrid Classifier (HC) and the Graduated Hybrid Classifier (GHC).

Hybrid Classifier (HC)

The hybrid classifier (HC) was trained on different samples drawn from different characteristics, or flavors, of DSS and OLTP workloads. It was expected that this would improve the prediction accuracy because this classifier 315 would attempt to generate rules that take into account a wider variety of workload properties. The Browsing and the TPC-H workloads were considered as flavors of DSS, and the Ordering and the TPC-C workloads were considered as flavors of OLTP.

Figure 12:
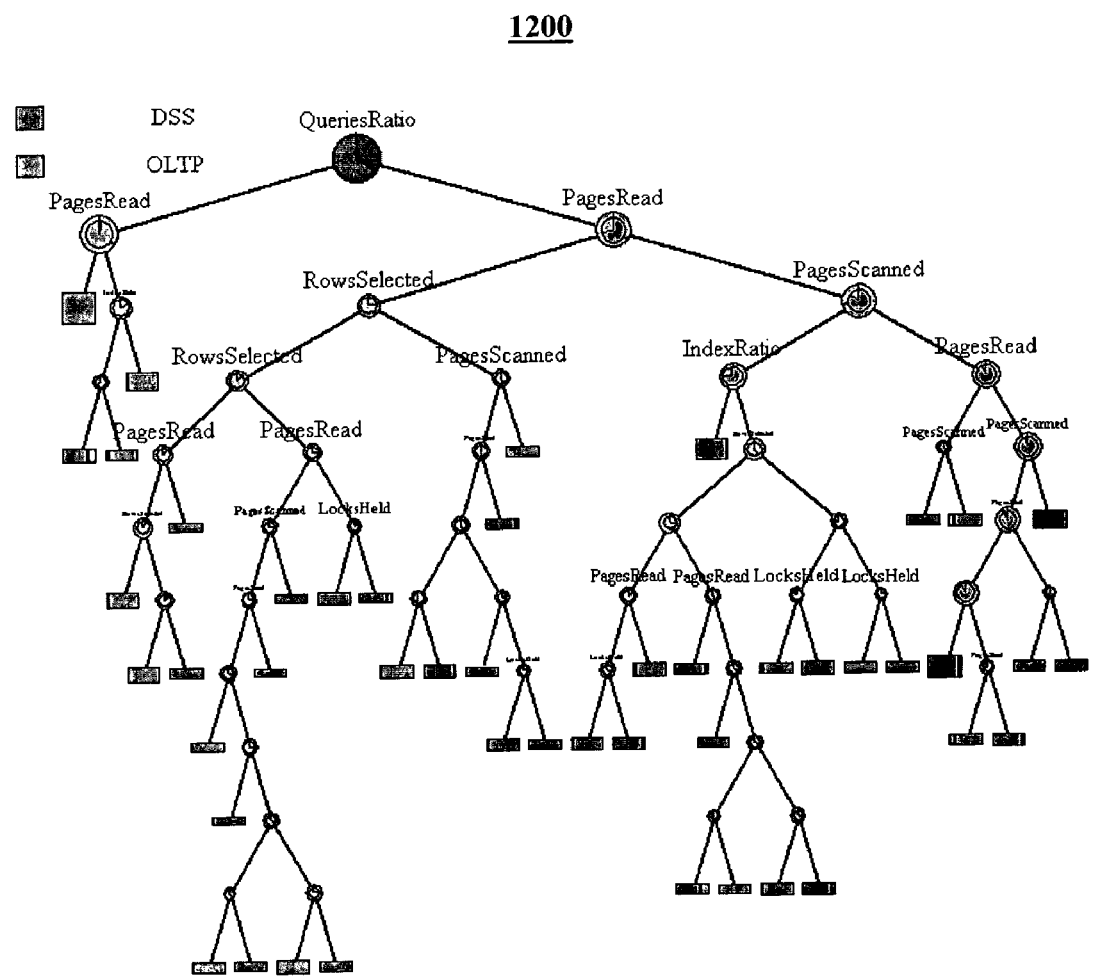
FIG. 12 is a diagram illustrating a decision tree of a hybrid classifier (HC)

FIG. 12 shows a pruned decision tree 1200 of HC, which appears structurally similar to a pruned tree 500 of Classifier (O, B), but is different with respect to its rules.

Graduated Hybrid Classifier (GHC)

For the purpose of effectively configuring and tuning a DBMS, it is useful to distinguish between a heavy DSS (HD) workload, such as TPC-H, and a light DSS (LD) workload, such as the Browsing profile. The same thing is true for a heavy OLTP (HO) workload, such as TPC-C, and a light OLTP (LO) workload, such as the Ordering profile.

The Graduated Hybrid Classifier (GHC) improves upon HC by explicitly recognizing a wider variety of workloads, specifically classes HD, LD, LO and HO. GHC demonstrates the ability of the methodology to devise a classifier 315 whose rules can identify finer differences among workloads. In other words, the methodology described here is able to handle the case of multiple workload types.

It was hypothesized that the DSS and OLTP percentages reported by the HC are the sums of the HD and LD percentages, and HO and LO percentages reported by the GHC, respectively. The results of these experiments validated this hypothesis, which may be explained below.

Evaluating the Generic Classifiers

The performance of the HC and GHC was compared with the results reported by the specialized classifier 315 (Classifier(C, H) or Classifier(O, B)) that was found to be better at identifying a particular workload sample. The classifiers 315 were again tested with both benchmark-generated workloads and industrial workloads.

Benchmark Workloads

Figure 13:
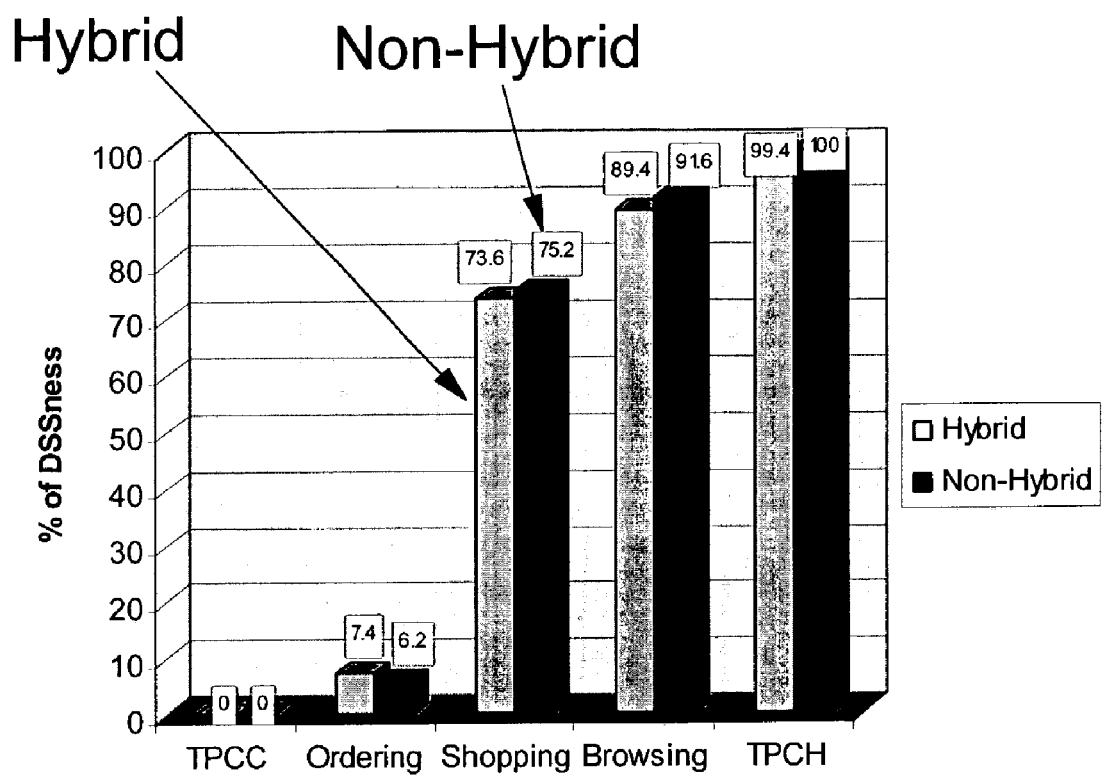
FIG. 13 is a chart illustrating prediction accuracy of the hybrid classifier (HC)

FIG. 13 shows the prediction accuracy of HC, tested on different testing samples drawn from the various benchmarks workloads. The reported DSSness percentage is extremely close to the results reported by each workload's genuine classifier 315.

Figure 14:
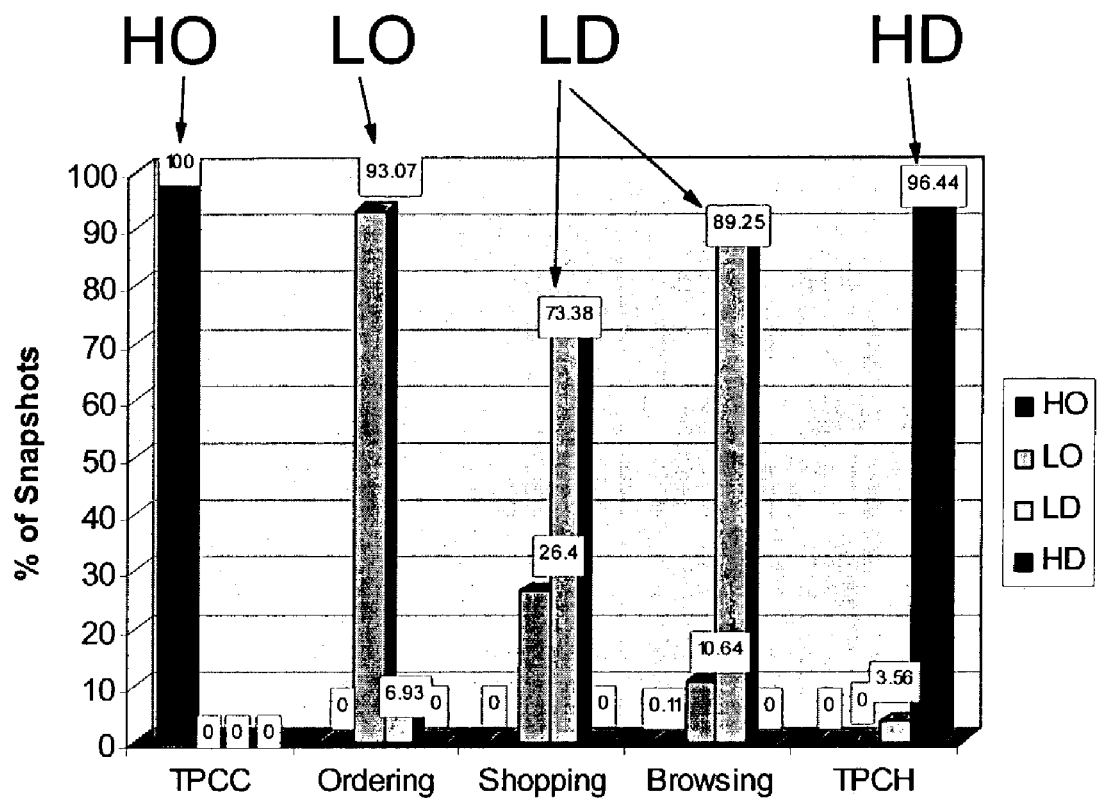
FIG. 14 is a chart illustrating GHC's analysis of TPC-generated workloads.

FIG. 14 shows the results of the GHC's analysis of the various TPC-generated workloads. This analysis decomposes each workload into four components: HO, LO, LD, and HD. It is rare to observe any HD or HO in the moderate TPC-W profiles. Similarly, the presence of the light workloads of TPC-W profiles is very little in the extreme workloads of TPC-C and TPC-H (there is 3.56% of LD in the TPC-H, which is very small). It was conjectured that the more varieties of workload types with which the hybrid classifiers 315 are trained, the more generic and useful they become.

Industrial Workloads

The results of the earlier experiments confirmed the assumption that Classifier(O, B) is an appropriate classifier 315 for identifying the workloads of the three e-business firms. Therefore, the performance of the two generic classifiers 315 should be compared with the performance of Classifier(O, B).

As seen in Table 4 (see FIG. 19), Classifier(O, B) reported 90.96% of DSSness in Firm-1's peak DSS workload, and HC reported a similar percentage, 89.79%. GHC also reported a similar percentage of DSSness, namely 88%, but made the further distinction that this was all light DSS (LD). GHC also indicated that the OLTP portion in Firm-1's workload is actually a mix of LO (11%) and HO (1%).

Table 4 (see FIG. 19) shows that all classifiers 315, including HC, assigned a high DSSness (almost 100%) to Firm-2's peak DSS workload. However, GHC makes the further differentiation that the workload is all LD, which is correct. Likewise, Classifier(O, B), HC and GHC all recognized the high percentage of OLTPness (100%) in Firm-2's peak OLTP workload.

With respect to Firm-3's workloads, all of the four classifiers 315 were able to correctly recognize Firm-3's peak DSS and peak OLTP workloads (see Table 4 in FIG. 19). GHC makes the further distinction that the OLTP workload is composed of 90.62% of LO and 9.38% of HO.

It is determined that GHC is more practical because it gives a qualitative dimension to what is being reported as DSS and OLTP. It was also observed that the total sum of HD and LD workloads reported by the GHC is almost equal to the DSSness reported by the HC. Similarly, the total sum of HO and LO workloads, reported by the GHC, is almost equal to the OLTPness reported by the HC. The results may indicate that GHC produced acceptable and finer classification rules that are able to distinguish among the various shades of DSS and OLTP workloads.

Concluding Remarks

To automatically manage their own performance, an autonomic DBMS should be able to recognize important characteristics of their workload, such as its type. A methodology was presented by which the DBMS can learn how to distinguish between today's two dominant workload types, namely DSS and OLTP. The methodology uses classification techniques from data mining to analyze performance data (of the workload) and to build a classifier 315 (a workload classifier module 305) for use by the DBMS for identifying types of workloads contained in a workload mix. Once built, the classifier 315 can be used to detect if the workload shifts from one type to another and to evaluate the relative intensity of each type at a point in time.

The methodology was demonstrated by creating and evaluating two classifiers 315. One classifier 315, Classifier (O, B), was built using the TPC-W Ordering and Browsing profiles as the OLTP and DSS training sets, respectively. The second classifier 315, Classifier (C, H), was built using the TPC-C and TPC-H benchmark workloads as the OLTP and DSS training sets, respectively. The key difference between the two classifiers 315 is the complexity of their decision trees. Classifier (C, H) comprises one single-attribute rule, namely a test against the Queries Ratio, while Classifier (O, B) uses more several multi-attribute rules to distinguish DSS from OLTP. It was found that the single-attribute classifier 315 did not identify general workloads as well as the multi-attribute classifier 315.

Three sets of experiments were presented with the classifiers 315. The first set of experiments shows the validity of the classifiers 315 since they are able to accurately recognize different test samples from their base workloads. The second set of experiments shows the robustness of the classifiers 315. Classifier (O, B) is able to accurately determine the relative concentration of DSS and OLTP work within the Shopping profile, which is a variation of its base workloads. Classifier (O, B) is also shown to be able to accurately recognize its base workloads under different system configurations. The third set of experiments examines the genericness of the classifiers 315. In these experiments, both benchmark and industrial workloads were used. It was found that Classifier (C, H), because of its trivial decision tree 600, was not able to adequately recognize some general workloads. Classifier (O, B), on the other hand, had good (acceptable) results with both the benchmark and industrial workloads.

It is believed that these experiments indicate that, despite the fact that every workload is a mix of its own set of SQL statements with their own characteristics, a generic classifier 315 may be constructed that is able to recognize a wide range of workloads. Two generic workload classifiers 315 for automatically recognizing the type of the workload were presented and evaluated.

The Hybrid Classifier (HC) was constructed with training sets that represent a wider range of different characteristics, or flavors, of DSS and OLTP workloads. These experiments show that such a training method improves the performance of the HC over the previous classifiers 315 because it forces the creation of more sophisticated rules that are capable of recognizing the different flavors of DSS and OLTP work.

The Graduated-Hybrid Classifier (GHC) improves upon HC by also reporting on the workload flavors (light and heavy) and their concentrations that constitute these DSS and OLTP portions in the analyzed sample. In addition to the practical benefits of being able to make finer distinctions, GHC demonstrates that the methodology is able to construct classifiers 315 for more than two workload types.

These experiments with benchmark workloads and the industry-supplied workloads confirmed that the total DSS-ness reported by the HC is almost equal to the summation of its components, the HD and LD, reported by the GHC. Similar results were observed with respect to the OLTPness and its components, HO and LO. This reflects the accuracy of the predictions of the hybrid classifiers 315.

The good results obtained from testing the generic classifiers 315 imply that it is feasible to consider incorporating the generic classifiers 315 into the DBMS to tune, or at least help tune, the system (DBMS). DB2 Universal Database v8.1 (a DBMS manufactured by IBM), for example, comprises a Configuration Advisor that defines settings for critical configuration parameters for a DB2 database based on workload characterization, and system environment. While the Configuration Advisor is able to automatically detect its physical system environment through programmatic means, it requires descriptive input from either a human operator or a calling application to define characteristics of the workload environment.

Figure 15:
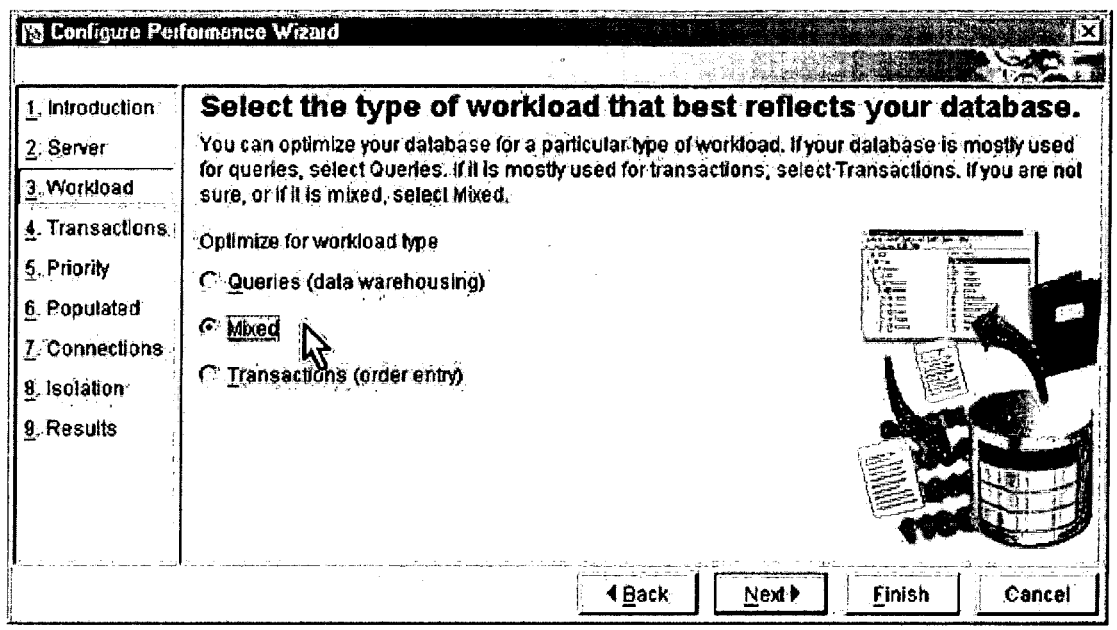
FIG. 15 is a representation of a GUI computer interface illustrating the present need for human intervention to identify the type of the workload.

FIG. 15 shows a GUI screen shot 1500 of the Configuration Advisor requesting descriptive input.

A workload classification module 305 may be used to automate the classification process, obviating the need for the user to provide some of the key input to the Configuration Advisor.

Automatic classification within the Configuration Advisor would allow for the automatic generation of settings for operational parameters such as memory allocations (sort, buffer pools, lock space, communication buffers, etc), parallelism degrees, aggressiveness of page cleaning or pre-fetching, and query optimization depth, whose internal modeling are a function of the workload classification. In many cases, it is reasonable to expect the classifier 315 to more accurately identify the operational workload than a human operator.

The methodology described herein is independent of any specific DBMS or classification tool. Moreover, based on the criteria that was set the selected snapshot attributes are the result of a comprehensive study of more than 220 performance variables. These variables are commonly available in today's commercial DBMSs such as DB2 and Oracle (reference is made to *Oracle9iDatabase Performance Guide and Reference*, Release 1(9.0.1), Part# A87503-02, Oracle Corp.: 2001) to allow DBAs observe and diagnose the performance of the system.

Optionally, the classifier 315 may comprise a feedback sub-module located between the classifier 315 and the DBA. This feedback sub-module permits the DBA to understand and correlate currently observed performance of the DBMS in view of the workload type reported by the classifier 315. This sub-module may help the DBA develop better performance-tuning strategies. Furthermore, the feedback sub-module would allow DBAs to corroborate the workload type reported by the classifier 315 and to determine if any retraining is necessary to improve the prediction accuracy of the classifier 315.

Optionally, the classifier 315 may be incorporated with the DBMS or information retrieval system. One approach is to provide a set of prefabricated, ready-to-use workload classifiers 315 for different types of popular workload types. A second approach is to adapt one of the hybrid classifiers 315 that is trained on a wide variety of workloads.

The classifier 315 may optionally comprise a prediction sub-module for predicting when a change in the workload type may occur. Although the online overhead of the workload classifier 315 is relatively low, it is only designed to be operated when the type of the workload changes. A prediction sub-nodule may be used to speculate when the workload type may change and the classifier 315 could then verify this prediction.

The classifier 315 may optionally comprise a Classifier Validation sub-module with which the classifier 315 may validate itself with respect to drastic changes in the properties of the business entity's workload. The DBMS system may therefore be able to determine when to refresh the classifier 315 to maintain high classification accuracy.

It is to be understood that the specific embodiments of the invention that have been described are merely illustrative of certain application of the principle of the present invention. Numerous modifications may be made to the method for identifying a workload type for a given workload of database requests invention described herein without departing from the spirit and scope of the present invention.

What is claimed is:

1. A method of identifying a workload type concentration for a given workload, the method comprising:

producing a plurality of performance snapshots of a training set, the training set comprising a plurality of training workloads, each training workload predetermined to elicit a particular database behavior associated with a known workload type, the workload type comprising one of an Online Transactional Processing (OLTP) type and a Decision Support System (DSS) type, an OLTP type characterized by short simple database queries with many concurrent users, a DSS type characterized by long complex database queries with few concurrent users, each performance snapshot comprising database behavior across a predetermined time interval and classified as one of OLTP and DSS;

extracting a set of attributes from the training set;

constructing a set of rules based on the classification of the plurality of performance snapshots and the set of attributes, the set of rules organized into a decision tree having a rule per tree node, each node of the decision tree configured for testing an attribute related to the workload type;

selecting a sample of the given workload; and identifying the workload type concentration of the selected sample based on a comparison between a plurality of performance snapshots from the selected sample and the set of rules, the workload type concentration comprising a combination of OLTP and DSS, wherein a database may be more accurately tuned based on the workload type concentration, thereby enhancing database performance.

2. The method of claim 1 wherein the set of rules tests for attributes relates to the workload type.

3. The method of claim 1 further comprising determining whether the workload type concentration identification is acceptable.

4. The method of claim 1 further comprising identifying a change in the workload type.

5. The method of claim 1 further comprising validating the set of rules when drastic changes occur to the given workload.

6. The method of claim 1 further comprising using a data mining process to construct the set of rules.

7. A method to identify a workload type concentration for a given workload, the method comprising:

producing a plurality of performance snapshots of a training set, the training set comprising a plurality of training workloads, each training workload predetermined to elicit a particular database behavior associated with a known workload type, the workload type comprising one of an Online Transactional Processing (OLTP) type and a Decision Support System (DSS) type, an OLTP type characterized by short simple database queries with many concurrent users, a DSS type characterized by long complex database queries with few concurrent users, each performance snapshot comprising database behavior across a predetermined time interval and classified as one of OLTP and DSS;

extracting a set of attributes from the training set;

constructing a set of rules based on the classification of the plurality of performance snapshots and the set of attributes, the set of rules organized into a decision tree having a rule per tree node, each node of the decision tree for testing an attribute related to the workload type;

selecting a sample of the given workload;

producing a plurality of performance snapshots for the selected sample;

comparing the plurality of performance snapshots from the selected sample and the set of rules;

classifying each performance snapshot from the selected sample as one of OLTP and DSS; and identifying the workload type concentration of the selected sample based on an OLTP to DSS ratio, the workload type concentration comprising a combination of OLTP and DSS, wherein a database may be more accurately tuned based on the workload type concentration, thereby enhancing database performance.

8. The method of claim 7 wherein the set of rules tests for attributes relates to the workload type.

9. The method of claim 7 further comprising determining whether the predicted workload type concentration identification is acceptable.

10. The method of claim 7 further comprising identifying a change in the workload type.

11. The method of claim 7 further comprising validating the set of rules when drastic changes occur to the given workload.

12. The method of claim 7 further comprising using a data mining process to construct the set of rules.

* * * * *